United States Patent Office 3,356,743
Patented Dec. 5, 1967

3,356,743
PRODUCTION OF 1-NAPHTHOL
Benjamin T. Freure, Charleston, W. Va., assignor to Union Carbide Corporation, a corporation of New York
No Drawing. Filed Nov. 21, 1963, Ser. No. 325,443
2 Claims. (Cl. 260—621)

This invention relates to a method for the conversion of mixtures of 1,2,3,4-tetrahydro-1-naphthol and 3,4-dihydro-1(2H)-naphthalenone to 1-naphthol. More particularly, this invention relates to a two-stage process for the catalytic dehydrogenation of mixtures of 1,2,3,4-tetrohydro-1-naphthol and 3,4-dihydro-1(2H)-naphthalenone to 1-naphthol at higher efficiencies.

It is known that 1-naphthol can be produced from 1,2,3,4-tetrahydronaphthalene, by a two-step, oxidation-dehydrogenation process. In the oxidation step 1,2,3,4-tetrahydronaphthalene is converted to a mixture of 3,4-dihydro-1(2H)-naphthalenone and 1,2,3,4-tetrahydro-1-naphthol in a mole ratio of from about 1.2:1 to about 15:1. In the dehydrogenation step, the oxidation product, hereinafter referred to as oxygenated 1,2,3,4-tetrahydronaphthalene, is converted to 1-naphthol by the simultaneous dehydrogenation of 1,2,3,4-tetrahydro-1-naphthol to 3,4-dihydro-1(2H)-naphthalenone and the dehydrogenation of 3,4-dihydro-1(2H)-naphthalenone to 1-naphthol, as is illustrated by the following equations:

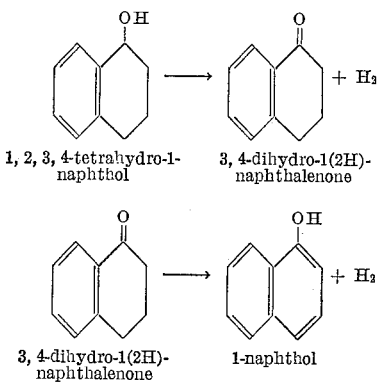

The dehydrogenation of 3,4-dihydro-1(2H)-naphthalenone and/or 1,2,3,4-tetrahydro-1-naphthol to 1-naphthol has been conducted with a variety of catalysts, including catalysts containing nickel, copper or platinum as the major catalytic components. None of these processes have been completely satisfactory for the dehydrogenation of oxygenated 1,2,34-tetrahydronaphthalene. For example, at the elevated temperatures required for maximum 1-naphthol yields (about 350° C. to 450° C.) the nickel and copper catalysts are susceptible to poisioning by sulfur and halogen impurities in the feed and have very short lives. On the other hand, although the platinum catalysts are resistant to sulfur or halogen poisoning and retain their catalytic activity for longer periods of time, they are very inefficient. This inefficiency results because at the temperatures necessary to obtain maximum yields of 1-naphthol, the 1,2,3,4-tetrahydro-1-naphthol, instead of forming 3,4-dihydro-1(2H)-naphthalenone, dehydrates almost quantitatively to form 1,2,-dihydronaphthalene which is dehydrogenated to naphthalene. Because of the lower efficiency of the platinum catalysts, it has been the practice to employ the otherwise less desirable nickel or copper catalysts to effect the dehydrogenation.

It has been discovered by this invention that the dehydrogenation can be conducted in two stages; the first under conditions favorable to the formation of 3,4-dihydro-1(2H)-naphthalenone 1,2,3,4-tetrahydro-1-naphthol from whereby the 1,2,3,4-tetrahydro-1-naphthol content of the oxygenated 1,2,3,4-tetrahydronaphthalene feed is reduced to no greater than 5, and preferably no greater than 3, weight percent of the oxygenated 1,2,3,4-tetrahydronaphthalene and the formation of hydrocarbons is minimized; and the second under conditions favorable to the formation of 1-naphthol. In general, the process of this invention comprises a mild catalytic vapor-phase dehydrogenation employing a nickel and/or copper catalyst followed by a more severe catalytic vapor-phase dehydrogenation employing a platinum catalyst. By operating in this manner, the nickel or copper catalysts are employed at conditions at which they retain their catalystic activity for long periods of time and the overall conversion of oxygenated 1,2,3,4-tetrahydronaphthalene to 1-naphthol is effected at efficiencies of about 90 percent or higher.

The first stage of the process of this invention comprises contacting oxygenated 1,2,3,4 - tetrahydronaphthalene vapors with a dehydrogenation catalyst containing nickel and/or copper as the major catalyst ingredient at a temperature of from about 200° C. to about 325° C. At temperatures in excess of about 325° C. the life of these catalysts declines rapidly and dehydration of the 1,2,3,4-tetrahydro-1-naphthol occurs. At temperatures below about 200° C. the rate of reaction is too slow for a commercially-acceptable process. Temperatures in the range of from about 275° C. to about 300° C. are preferred.

The catalysts which are employed in the first stage of the process of this invention are the known dehydrogenation catalysts containing copper and/or nickel as the primary catalytic ingredient. In addition to these metals, the catalysts can contain other components to modify their activity, such as inorganic alkali metal salts, chromium oxides and the like. The catalysts are employed on any convenient support material such as silica, activated carbon, alumina and the like. Illustrative of the catalysts of this type which can be employed are the catalysts disclosed by Chitwood et al. in U.S. Patent 2,588,359 and by Opitz et al. in U.S. Patent 2,861,106. Preferred catalysts are those disclosed by Chitwood et al. because of their effectiveness in converting substantial amounts of 3,4-dihydro-1(2H)-naphthalenone to naphthol at the relatively mild conditions of the first stage.

It is preferred to conduct the dehydrogenation in the presence of hydrogen. Although the presence of hydrogen is not essential, its use is desirable to aid in the vaporization of the oxygenated 1,2,3,4-tetrahydronaphthalene and to prolong catalyst life. The amount of hydrogen employed is not highly critical, and it can be present in an amount varying from about 0.5 to about 15 or more moles of hydrogen per mole of oxygenated 1,2,3,4-tetrahydronaphthalene. Molar ratios in the range of from about 2:1 to about 7:1 are preferred.

The pressure at which the dehydrogenation is conducted is not particularly critical, and atmospheric, super-atmospheric and subatmospheric pressures can be employed. Pressures at about atmospheric or slightly above are preferred. Greatly elevated pressures tend to suppress the reaction and substantially subatmospheric pressures result in lower production rates per reaction volume and for these reasons are not desirable.

The residence time in the dehydrogenation zone is not narrowly critical, and residence times of from about 3 seconds to about 20 seconds can be employed. Residence times of from about 5 seconds to about 30 seconds are preferred.

The product of the first stage dehydrogenation, containing below about 5 weight percent 1,2,3,4-tetrahydro-1-naphthol is contacted with a platinum catalyst to effect the dehydrogenation of 3,4-dihydro-1(2H)-naphthalenone to 1-naphthol. The conditions for this step are substantially the same as those employed in the first step, except that the temperature is in the range of from about 350° C.

to about 450° C., and preferably in the range of from about 375° C. to about 425° C.

The catalysts employed in this step are those containing platinum as the main catalytic ingredient on a suitable support such as silica, activated carbon or alumina. In addition to platinum, the catalyst can contain other components as modifiers, such as alkali metal compounds and the like. Suitable catalysts of this type are disclosed by Taylor et al. in U.S. Patent 2,503,641.

The following example is illustrative. In this example, the percent yield, conversion and efficiency were determined by the following equations:

$$\text{Percent yield} = \left(\frac{A}{B}\right) \times 100$$

$$\text{Percent conversion} = \left(\frac{B-C}{B}\right) \times 100$$

$$\text{Percent efficiency} = \left(\frac{A}{B-C}\right) \times 100$$

wherein A is the difference between the mole percent 1-naphthol in the product and in the feed; B is the total mole percent of 1,2,3,4-tetrahydro-1-naphthol and 3,4-dihydro-1(2H)-naphthalenone in the feed; and C is the total mole percent of 1,2,3,4-tetrahydro-1-naphthol and 3,4-dihydro-1(2H)-naphthalenone in the product.

*Example I*

A catalyst containing about 11 weight percent nickel, 0.2 weight percent chromium, 3.5 weight percent copper and 0.06 weight percent sodium sulfate on a silica support was prepared as described in U.S. Patent 2,588,359. The catalyst was heated to 290° C. and a feed consisting of 87 weight percent of a 1,2,3,4-tetrahydro-1-naphthol-3,4-dihydro-1(2H)-naphthalenone mixture in a weight ratio of 1,2,3,4-tetrahydro-1-naphthol to 3,4-dihydro-1(2H)-naphthalenone of 1.5:1 and 13 weight percent hydrocarbons, such as is obtained from the liquid-phase oxidation of 1,2,3,4-tetrahydronaphthalene, in admixture with six moles of hydrogen per mole of oxidized 1,2,3,4-tetrahydronaphthalene, was passed through the catalyst at a rate such that the contact time was 5 seconds. The product contained 45 weight percent 3,4-dihydro-1(2H)-naphthalenone, 37 percent naphthol, 2 percent 1,2,3,4-tetrahydro-1-naphthol and 17 percent hydrocarbons, for a yield of 44%, a conversion of 46% and an efficiency of 95%.

The resulting product was passed in admixture with three moles of hydrogen per mole of oxygenated 1,2,3,4-tetrahydronaphthalene through a commercially-available platinum catalyst at a temperature of 400° C. to obtain a product containing 61 weight percent 1-naphthol, 22 weight percent 3,4-dihydro-1(2H)-naphthalenone and 17 weight percent hydrocarbons. The yield, conversion and efficiency for this step was 52%, 53% and 99%, respectively. For the entire process, the yield of 1-naphthol was 72%, the degree of conversion of oxygenated 1,2,3,4-tetrahydronaphthalene to 1-naphthol was 75 percent and the overall efficiency was 97%.

When a feed containing 68 percent 3,4-dihydro-1(2H)-naphthalenone, 28 percent 1,2,3,4-tetrahydro-1-naphthol and 7 percent hydrocarbons was dehydrogenated in a similar manner at 400° C. over the platinum catalyst naphthol was obtained in only a 36% yield at 77 percent conversion and an efficiency of only 47 percent.

What is claimed is:

1. The method for converting oxygenated 1,2,3,4-tetrahydronaphthalene to 1-naphthol which comprises the steps of (1) dehydrogenating said oxygenated 1,2,3,4-tetrahydronaphthalene in admixture with hydrogen in contact with a catalyst containing a metal selected from the group consisting of copper and nickel and mixtures thereof as the primary catalytic element at a temperature of from 200° C. to 325° C. for a period of time sufficient to reduce the 1,2,3,4-tetrahydro-1-naphthol content of said oxygenated 1,2,3,4-tetrahydronaphthalene to not greater than about 5 weight percent and (2) dehydrogenating the product of step (1) in admixture with hydrogen in contact with a platinum catalyst at a temperature of from 350° C. to 450° C.

2. The method for producing 1-naphthol which comprises the steps of (1) contacting a stream of oxygenated 1,2,3,4-tetrahydronaphthalene consisting essentially of 3,4-dihydro-1(2H)-naphthalenone and 1,2,3,4 - tetrahydro-1-naphthol mixture in a molar ratio of from about 1.2:1 to about 15:1 with from about 0.5 to about 15 moles of hydrogen per mole of said mixture, in the presence of a platinum free dehydrogenation catalyst containing a metal selected from the group consisting of nickel and copper and mixtures thereof as the primary catalyst element at a temperature of from 200° C. to 325° C. for a period of time sufficient to reduce the 1,2,3,4-tetrahydro-1-naphthol content of said oxygenated 1,2,3,4-tetrahydronaphthalene to not greater than about 5 weight percent and (2) heating the resulting mixture at a temperature of 350° C. to 425° C. in contact with a platinum catalyst.

References Cited

UNITED STATES PATENTS

| | | | |
|---|---|---|---|
| 2,503,641 | 4/1950 | Taylor et al. | 260—621 |
| 2,588,359 | 3/1952 | Chitwood et al. | 260—621 |
| 3,256,348 | 6/1966 | Schlossman | 260—621 |

LEON ZITVER, *Primary Examiner.*

H. ROBERTS, D. M. HELFER, *Assistant Examiners.*